US012710271B2

(12) United States Patent
Hiraga et al.

(10) Patent No.: US 12,710,271 B2
(45) Date of Patent: Aug. 18, 2026

(54) SENSOR AND ELECTRONIC DEVICE

(71) Applicant: KABUSHIKI KAISHA TOSHIBA, Tokyo (JP)

(72) Inventors: Hiroki Hiraga, Saitama Saitama (JP); Yasushi Tomizawa, Tokyo (JP); Kei Masunishi, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 282 days.

(21) Appl. No.: 18/455,887

(22) Filed: Aug. 25, 2023

(65) Prior Publication Data

US 2024/0219178 A1 Jul. 4, 2024

(30) Foreign Application Priority Data

Jan. 4, 2023 (JP) ................................ 2023-000131

(51) Int. Cl.
*G01C 19/5705* (2012.01)

(52) U.S. Cl.
CPC ................................ *G01C 19/5705* (2013.01)

(58) Field of Classification Search
None
See application file for complete search history.

(56) References Cited

U.S. PATENT DOCUMENTS

| | | | | |
|---|---|---|---|---|
| 5,915,276 A * | 6/1999 | Fell | G01C 19/5677 | 73/504.13 |
| 6,076,401 A * | 6/2000 | Okada | G01C 19/5712 | 73/504.12 |
| 6,481,285 B1 * | 11/2002 | Shkel | G01C 19/5719 | 73/504.13 |
| 7,168,318 B2 | 1/2007 | Challoner et al. | | |
| 7,637,156 B2 * | 12/2009 | Araki | G01C 19/5684 | 73/504.12 |

(Continued)

FOREIGN PATENT DOCUMENTS

| | | | |
|---|---|---|---|
| JP | 2010-8123 A | 1/2010 | |
| JP | WO2010/104064 A1 | 9/2010 | |

(Continued)

OTHER PUBLICATIONS

Japan Patent Office, Office Action in JP Application No. 2023-000131, (Feb. 25, 2026).

*Primary Examiner* — Mark A Shabman
(74) *Attorney, Agent, or Firm* — Finnegan, Henderson, Farabow, Garrett & Dunner, LLP

(57) ABSTRACT

According to one embodiment, a sensor includes a housing, a sensor section, and a plurality of first fixing members. The housing includes a housing base. The sensor section is surrounded by the housing. The sensor section includes a sensor base, a support portion fixed to the sensor base, a movable portion supported by the support portion, and a plurality of fixed electrodes fixed to the sensor base and facing the movable portion. A first gap is provided between the sensor base and the movable portion. The fixed electrodes are provided in n-rotational symmetry in a first plane perpendicular to a first direction from the sensor base to the support portion. The n is an integer of 2 or more. The plurality of first fixing members fix the sensor base to the housing base. The first fixing members are provided in the n-rotational symmetry in the first plane.

18 Claims, 6 Drawing Sheets

(56) References Cited

U.S. PATENT DOCUMENTS

| | | | | |
|---|---|---|---|---|
| 9,696,158 | B2 * | 7/2017 | Jomori | G01C 19/5712 |
| 11,656,079 | B2 * | 5/2023 | Hiraga | G01C 19/5726<br>73/504.02 |
| 2016/0087550 | A1 | 3/2016 | Nagata et al. | |
| 2016/0153779 | A1 * | 6/2016 | Vohra | G01C 19/5684<br>73/504.12 |
| 2018/0278235 | A1 * | 9/2018 | Otsuki | H03H 9/0542 |
| 2020/0284582 | A1 | 9/2020 | Kaji et al. | |
| 2022/0276052 | A1 | 9/2022 | Hiraga et al. | |

FOREIGN PATENT DOCUMENTS

| | | | |
|---|---|---|---|
| JP | 2010-276478 | A | 12/2010 |
| JP | 2020-144065 | A | 9/2020 |
| JP | 2022-131004 | A | 9/2022 |

* cited by examiner

SENSOR AND ELECTRONIC DEVICE

CROSS-REFERENCE TO RELATED APPLICATIONS

This application is based upon and claims the benefit of priority from Japanese Patent Application No. 2023-000131, filed on Jan. 4, 2023; the entire contents of which are incorporated herein by reference.

FIELD

Embodiments described herein relate generally to a sensor and an electronic device.

BACKGROUND

There are sensors such as gyro sensors. Stable characteristics are desired in sensors and electronic devices.

DETAILED DESCRIPTION

Figure 1:
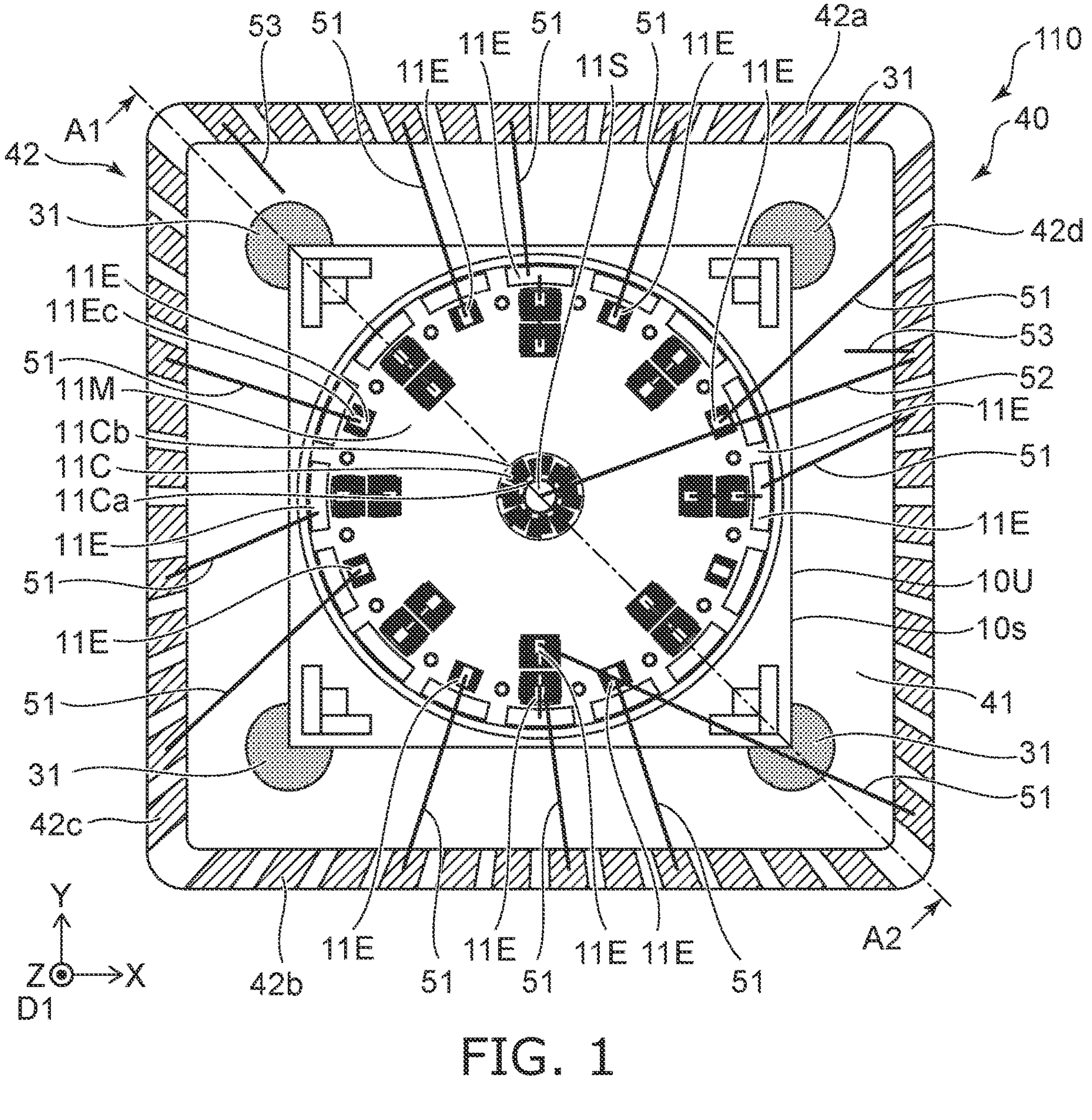
FIG. 1 is a schematic plan view illustrating a sensor according to a first embodiment.

According to one embodiment, a sensor includes a housing, a sensor section, and a plurality of first fixing members. The housing includes a housing base. The sensor section is surrounded by the housing. The sensor section includes a sensor base, a support portion fixed to the sensor base, a movable portion supported by the support portion, and a plurality of fixed electrodes fixed to the sensor base and facing the movable portion. A first gap is provided between the sensor base and the movable portion. The plurality of fixed electrodes are provided in n-rotational symmetry in a first plane perpendicular to a first direction from the sensor base to the support portion. The n is an integer of 2 or more. The plurality of first fixing members fix the sensor base to the housing base. The plurality of first fixing members are provided in the n-rotational symmetry in the first plane.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 2:
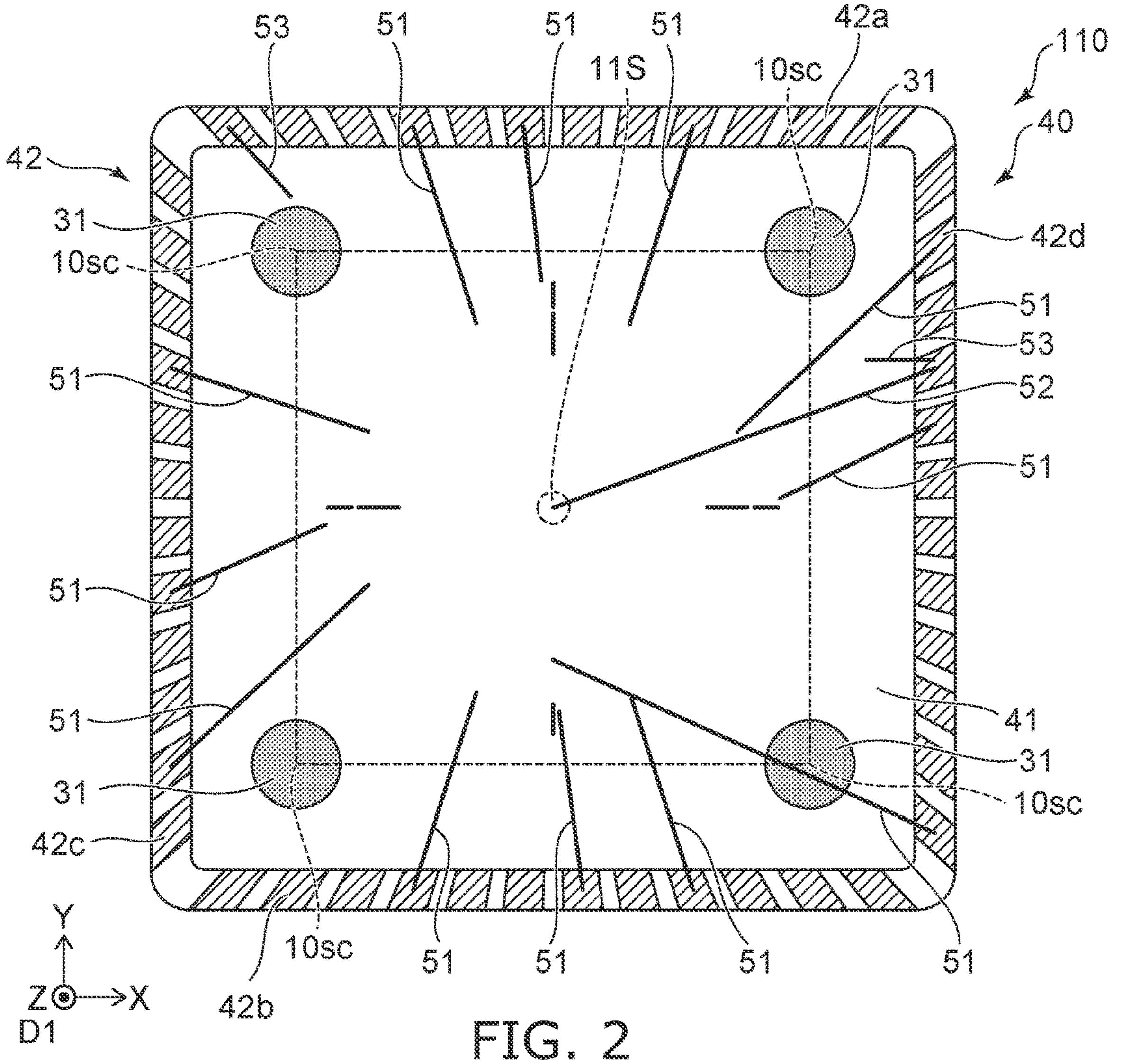
FIG. 2 is a schematic plan view illustrating the sensor according to the first embodiment.

FIGS. 1 and 2 are schematic plan views illustrating a sensor according to a first embodiment.

Figure 3:
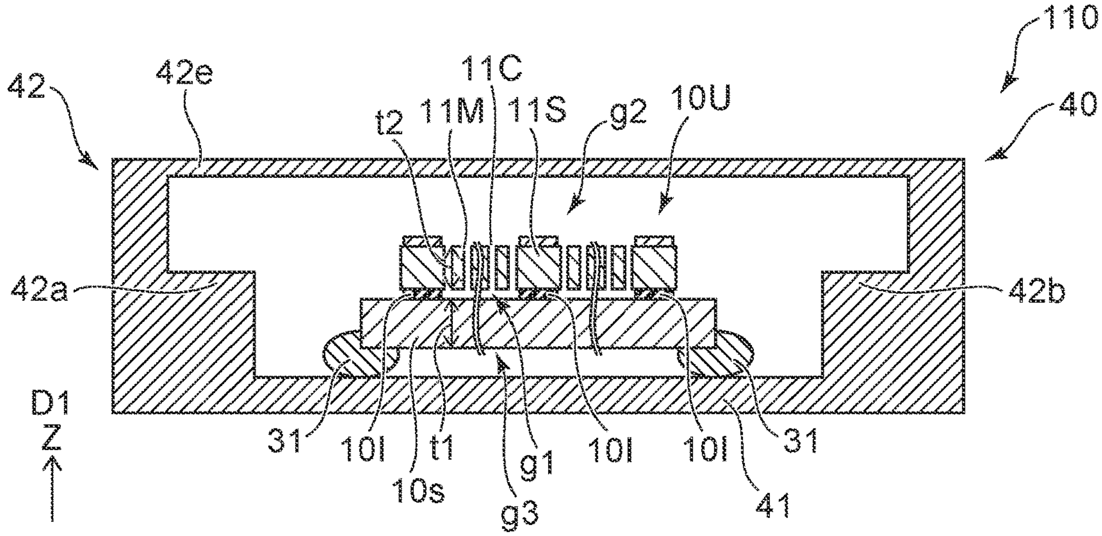
FIG. 3 is a schematic cross-sectional view illustrating the sensor according to the first embodiment.

FIG. 3 is a schematic cross-sectional view illustrating the sensor according to the first embodiment.

FIG. 1 is a plan view of a portion of the structure illustrated in FIG. 3. In FIG. 2, some elements illustrated in FIG. 1 are omitted. FIG. 3 is a cross-sectional view taken along line A1-A2 of FIG. 1.

As shown in FIGS. 1 to 3, a sensor 110 according to the embodiment includes a housing 40, a sensor section 10U, and a plurality of first fixing members 31.

The housing 40 includes a housing base 41. The housing 40 may further include a housing member 42. The housing member 42 is connected to the housing base 41. For example, the housing member 42 includes a first side portion 42*a*, a second side portion 42*b*, a third side portion 42*c*, a fourth side portion 42*d*, and a fifth portion 42*e*. The first side portion 42*a*, the second side portion 42*b*, the third side portion 42*c*, and the fourth side portion 42*d* are connected to the housing base 41 and the fifth portion 42*e*. The boundaries of these portions to each other may be clear or unclear. A space is formed between the housing base 41 and the housing member 42. For example, the sensor section 10U is provided in the space.

The sensor section 10U is surrounded by the housing 40. The sensor section 10U includes a sensor base 10*s*, a support portion 11S, a movable portion 11M, and a plurality of fixed electrodes 11E. The support portion 11S is fixed to the sensor base 10*s*. The movable portion 11M is supported by the support portion 11S. The plurality of fixed electrodes 11E are fixed to the sensor base 10*s*. The plurality of fixed electrodes 11E face the movable portion 11M.

As shown in FIG. 3, a first gap g1 is provided between the sensor base 10*s* and the movable portion 11M. In this example, the sensor section 10U further includes a connect portion 11C. A portion 11Ca (one end) of the connect portion 11C is connected to the support portion 11S. Another portion 11Cb (the other end) of the connect portion 11C is connected to the movable portion 11M. A part of the first gap g1 is provided between the sensor base 10*s* and the connect portion 11C. The connect portion 11C is a spring part, for example.

As shown in FIG. 3, a first direction D1 from the sensor base 10*s* to the support portion 11S is defined as a Z-axis direction. One direction perpendicular to the Z-axis direction is defined as an X-axis direction. A direction perpendicular to the Z-axis direction and the X-axis direction is defined as a Y-axis direction.

As shown in FIG. 1, the plurality of fixed electrodes 11E are provided in n-rotational symmetry on a first plane (X-Y plane) perpendicular to the first direction D1. "n" is, for example, an integer of 2 or more. "n" may be 4 or more. For example, "n" may be 6. For example, "n" may be eight.

The plurality of first fixing members 31 fix the sensor base 10*s* to the housing base 41. As shown in FIG. 3, at least some of the plurality of first fixing members 31 are provided between the housing base 41 and the sensor base 10*s*. On the first plane (X-Y plane), the plurality of first fixing members 31 are provided in the n-rotational symmetry.

In the embodiment, the number ("n") of rotational symmetries of the plurality of fixed electrodes 11E is the same as the number of rotational symmetries of the plurality of first fixing members 31. By such a configuration, more stable characteristics can be obtained.

As shown in FIGS. 1 and 2, for example, sensor 110 further includes a plurality of first connection conductive members 51. One of the plurality of first connection conductive members 51 is electrically connected to one of the plurality of fixed electrodes 11E. For example, one end of one of the plurality of first connection conductive members 51 is electrically connected to one of the plurality of fixed electrodes 11E. For example, another end of the one of the plurality of first connection conductive members 51 is electrically connected to one of the plurality of electrodes provided on the housing 40. The plurality of first connection conductive members 51 are, for example, bonding wire.

An electrical signals are supplied from the outside to the plurality of fixed electrodes 11E via the plurality of first connection conductive members 51. The electric signal causes the movable portion 11M to vibrate. The vibration includes a component in the X-Y plane. When an external force is applied to sensor 110, the vibration state of movable portion 11M changes. The vibration state is responsive to the external forces applied to sensor 110. The external force can be detected by detecting a change in the vibration state.

As described above, the number ("n") of rotational symmetries of the plurality of fixed electrodes 11E is the same as the number of rotational symmetries of the plurality of first fixing members 31. Due to the uniform rotational symmetry, high stability is obtained in the vibration of the movable portion 11M. Stable characteristics can be obtained.

As shown in FIG. 1, each of the plurality of fixed electrodes 11E includes a connection points 11Ec electrically connected to the plurality of first connection conductive members 51. The plurality of connection points 11Ec of the plurality of fixed electrodes 11E are provided in the n-rotational symmetry. The number of rotational symmetry of the plurality of connection points 11Ec is the "n" described above. Due to the uniform rotational symmetry, high stability is obtained in the vibration of the movable portion 11M. Stable characteristics can be obtained.

As shown in FIG. 1, the plurality of first connection conductive members 51 do not overlap the plurality of first fixing members 31 in the first direction D1. For example, a distance between the support portion 11S and the plurality of first connection conductive members 51 is shorter than a distance between the support portion 11S and the plurality of first fixing members 31.

For example, the plurality of fixed electrodes 11E are provided inside the outer edge of a circle that circumscribes the plurality of first fixing members 31 on the first plane (X-Y plane). For example, the movable portion 11M may have an annular shape centered on the support portion 11S.

As shown in FIG. 3, the sensor section 10U is located between the housing base 41 and a part of the housing member 42 (the fifth portion 42*e*) in the first direction D1. A second gap g2 is provided between the sensor section 10U and the part of the housing member 42 (the fifth portion 42*e*). The pressure inside the housing 40 is less than 1 atmosphere. As shown in FIG. 3, a third gap g3 may be provided between the housing base 41 and the sensor base 10*s*. Thermal influence from the outside can be suppressed in the sensor section 10U.

For example, the size of each of the plurality of first fixing members 31 may be small. By providing the plurality of first fixing members 31 being small, gas released from the plurality of first fixing members 31 can be suppressed. The pressure inside the housing 40 can be kept low.

For example, in a reference example in which the sensor base 10*s* is fixed to the housing base 41 by a fixing member having a large area, it is difficult to keep the pressure inside the housing 40 low due to gas released from the fixing member. In the embodiment, the plurality of first fixing members 31 being small with the n-rotational symmetry are provided. As a result, the pressure inside the housing 40 can be kept low.

As shown in FIG. 3, a thickness along the first direction D1 of the sensor base 10*s* is defined as a first thickness t1. A thickness along the first direction D1 of the movable portion 11M is defined as a second thickness t2. In embodiments, the first thickness t1 is not more than 2 times the second thickness t2. By providing the sensor base 10*s* being thin, the gas emitted from the sensor base 10*s* is suppressed. It is easy to maintain the pressure inside the housing 40 to be low.

The first thickness t1 along the first direction D1 of the sensor base 10*s* is preferably 100 μm or less, for example. The second thickness t2 along the first direction D1 of the movable portion 11M is preferably 100 μm or less. Gas release is suppressed. It is easy to maintain the pressure inside the housing 40 to be low.

As already described, the first connection conductive member 51 is connected to the plurality of fixed electrodes 11E. For example, bonding is performed. In the bonding, stress is applied to the plurality of fixed electrodes 11E. In a case where the sensor base 10*s* being thin is provided, the sensor base 10*s* is easily damaged by the bonding. For example, the sensor base 10*s* is destroyed.

In the embodiment, the number of rotational symmetries of the fixed electrodes 11E is the same as the number of rotational symmetries of the first fixing members 31. As a result, even when the sensor base 10*s* being thin is provided, the damage due to stress due to the bonding is suppressed. The number of rotational symmetries of the plurality of connection points 11Ec of the plurality of fixed electrodes 11E is the same as the number of rotational symmetries of the plurality of first fixing members 31. As a result, even when the sensor base 10*s* being thin is provided, the damage due to stress due to the bonding is suppressed.

As shown in FIG. 3, the sensor section 10U may further include an intermediate layer 10I. At least a part of the intermediate layer 10I is provided between the sensor base 10*s* and the support portion 11S. The part of the intermediate layer 10I is provided between the sensor base 10*s* and the plurality of fixed electrodes 11E. The intermediate layer 10I include, for example, silicon oxide.

As shown in FIG. 1, the sensor 110 may further include a second connection conductive member 52. One end of the second connection conductive member 52 is electrically connected to the support portion 11S. Another end of the second connection conductive member 52 is electrically connected to an electrode provided on the housing 40, for example. The movable portion 11M is electrically connected to the second connection conductive member 52 via the connect portion 11C and the support portion 11S.

As shown in FIG. 1, the sensor 110 may further include a third connection conductive member 53. One end of the third connection conductive member 53 is electrically connected to the sensor base 10*s*. The other end of the third connection conductive member 53 is electrically connected to an electrode provided on the housing 40, for example.

As shown in FIGS. 1 to 3, in the sensor 110, at least a part of the plurality of first fixing members 31 overlap a corner portion 10*sc* (see FIG. 2) of the sensor base 10*s* in the first direction D1.

Figure 4:
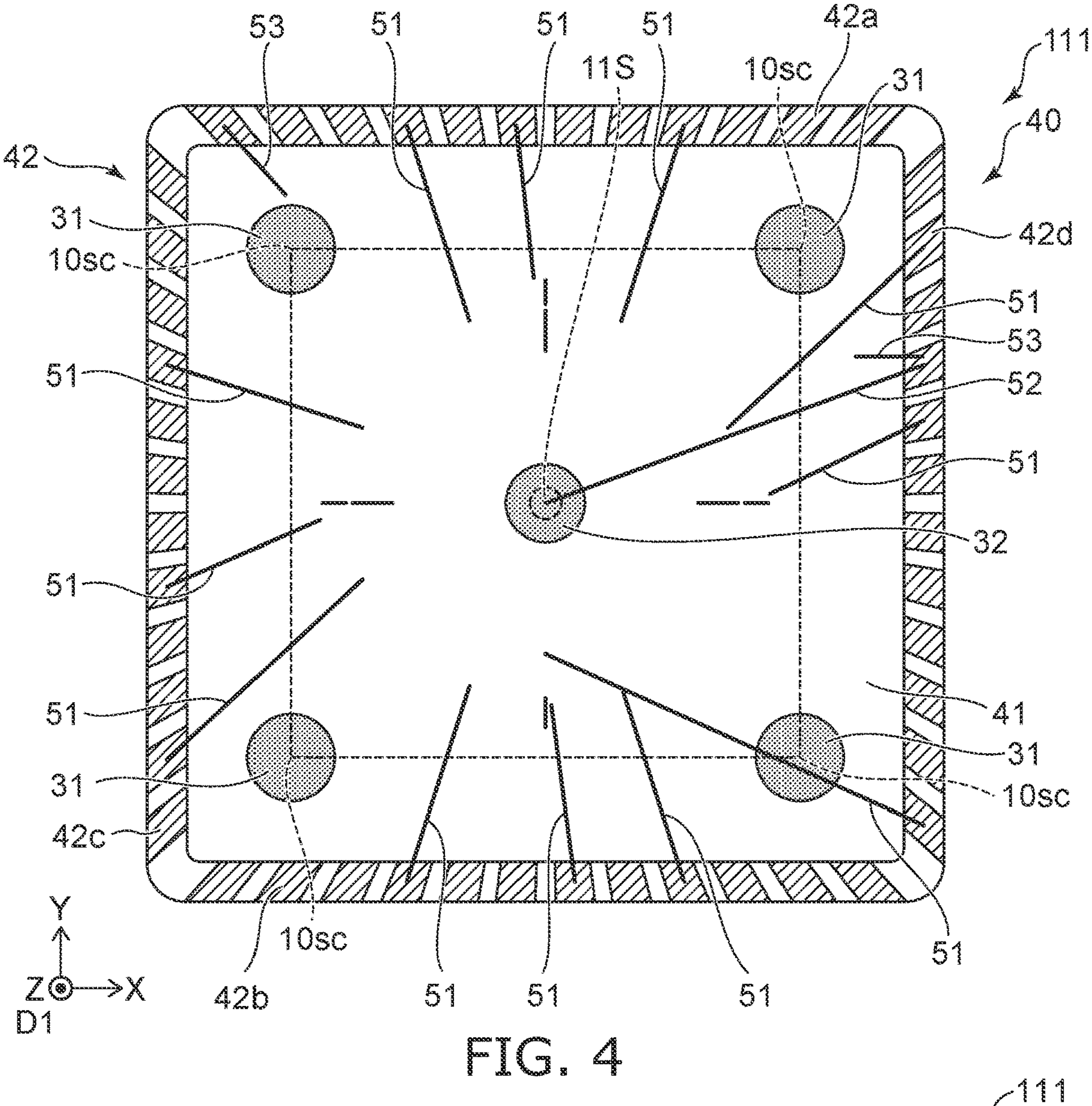
FIG. 4 is a schematic plan view illustrating a sensor according to the first embodiment.

FIG. 4 is a schematic plan view illustrating a sensor according to the first embodiment.

Figure 5:
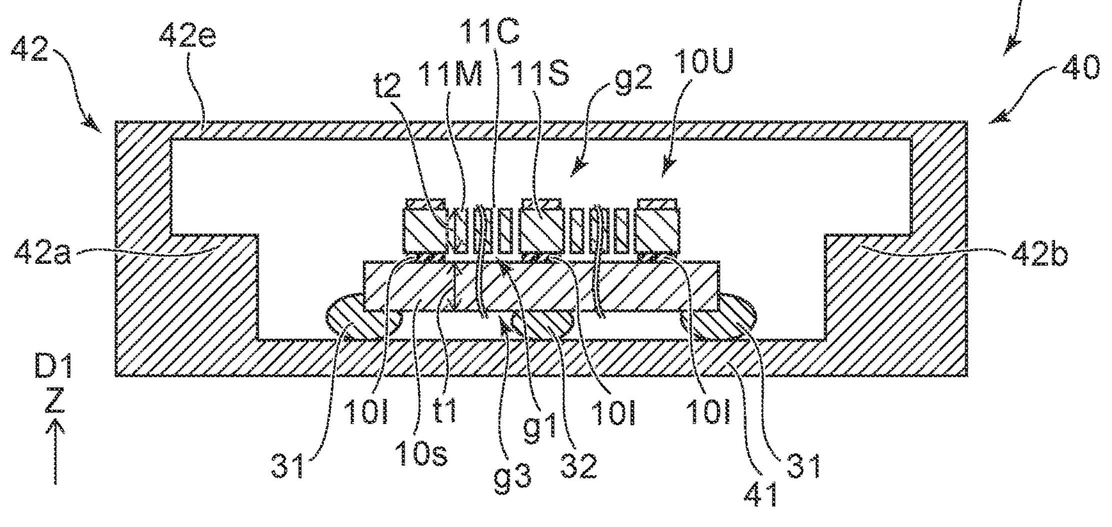
FIG. 5 is a schematic cross-sectional view illustrating the sensor according to the first embodiment.

FIG. 5 is a schematic cross-sectional view illustrating the sensor according to the first embodiment.

A shown in FIGS. 4 and 5, a sensor 111 according to the embodiment further includes a second fixing member 32. Except for this, the configuration of the sensor 111 is the same as the configuration of the sensor 110.

As shown in FIG. 5, the second fixing member 32 is provided between the housing base 41 and the sensor base 10*s*. At least a part of the second fixing member 32 overlaps the support portion 11S in the first direction D1. By providing the second fixing member 32, the stability of the support portion 11S is improved, for example.

Figure 6:
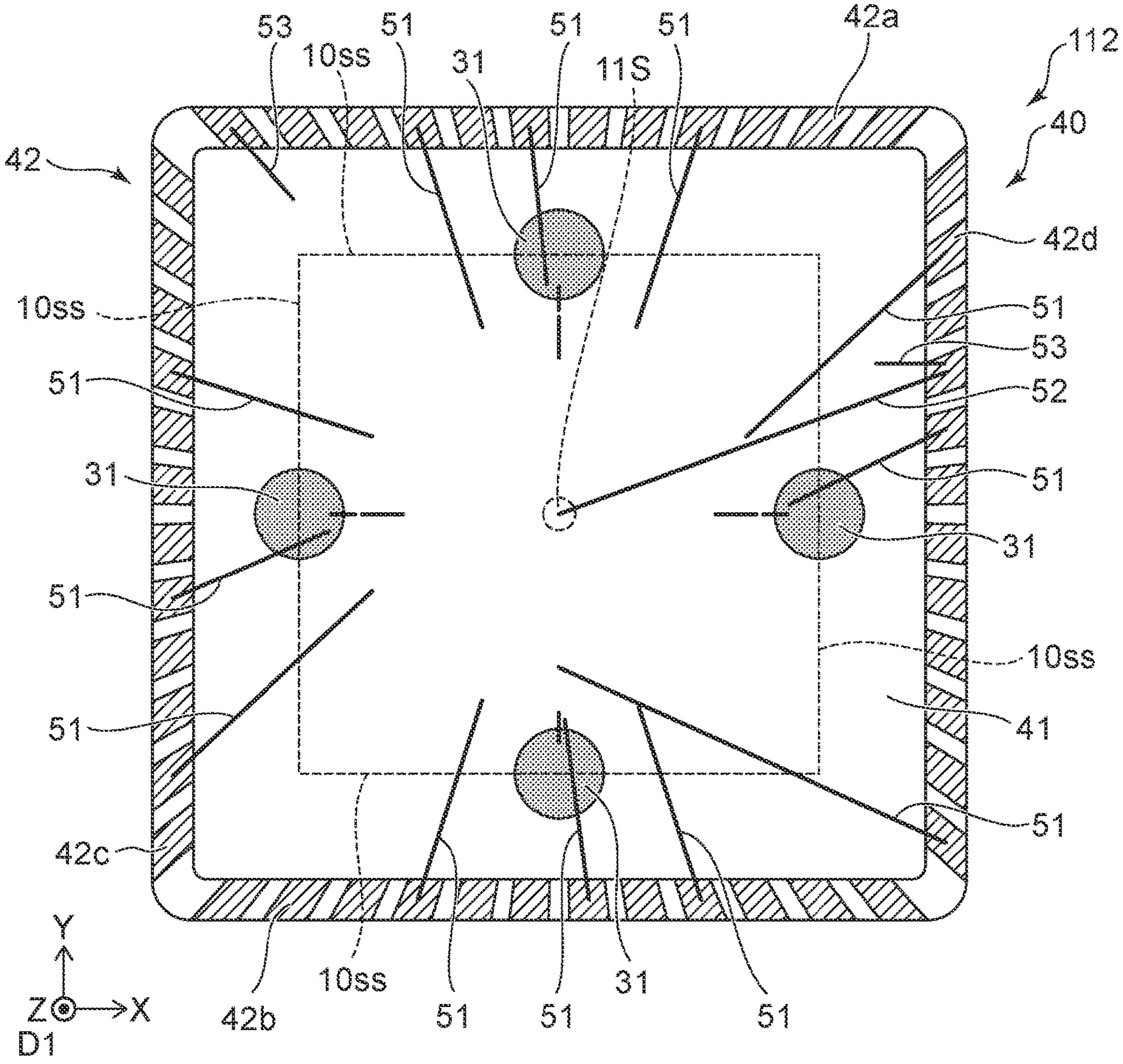
FIG. 6 is a schematic plan view illustrating a sensor according to the first embodiment.

FIG. 6 is a schematic plan view illustrating a sensor according to the first embodiment.

As shown in FIG. 6, in a sensor 112 according to the embodiment, at least a part of the plurality of first fixing members 31 overlap a side 10*ss* of the sensor base 10*s* in the first direction D1. Except for this, the configuration of the sensor 112 is the same as the configuration of the sensor 110. In the sensor 112 as well, stable characteristics are obtained. The second fixing member 32 may be provided in the sensor 112.

Figure 7:
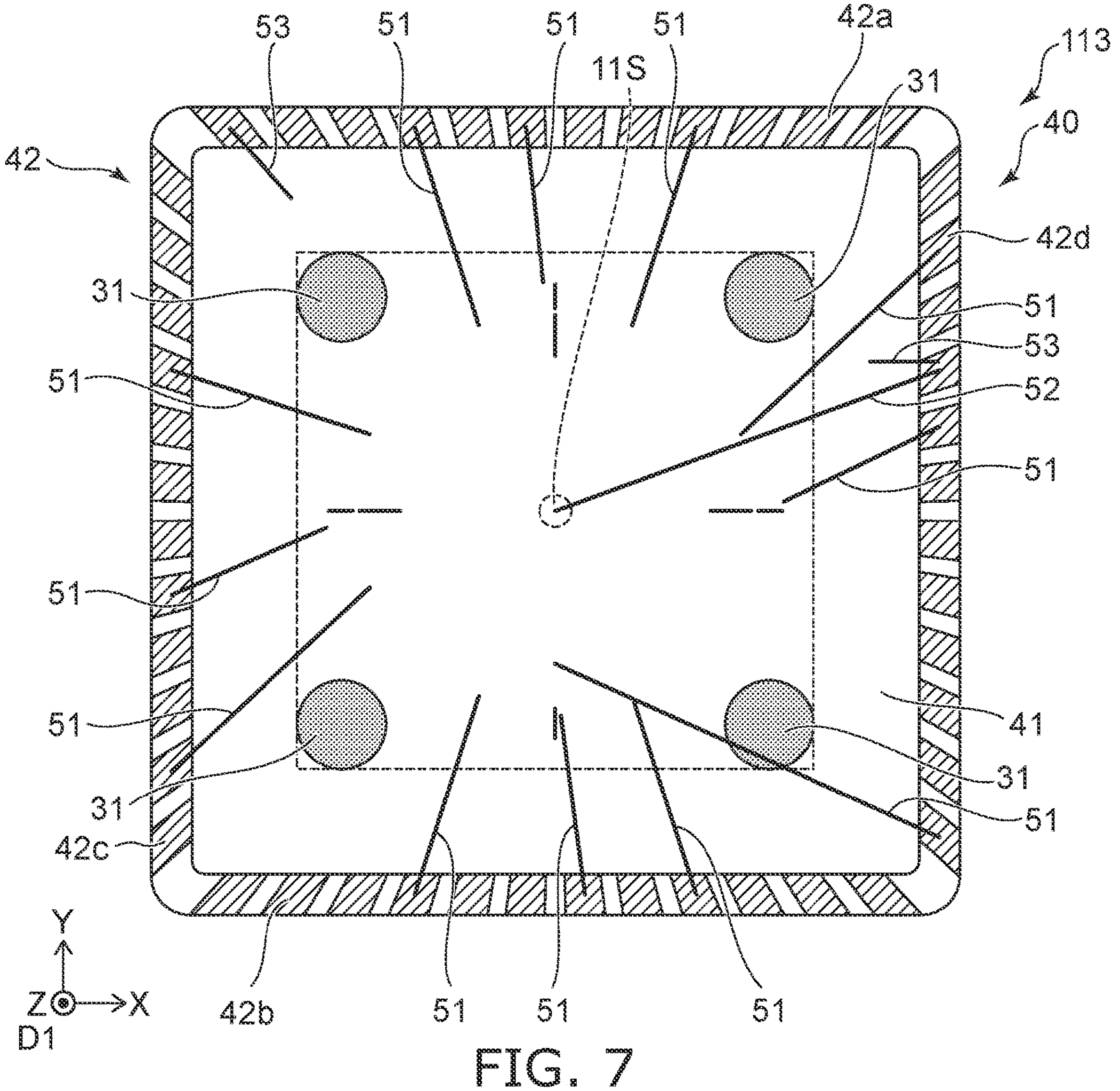
FIG. 7 is a schematic plan view illustrating a sensor according to the first embodiment.

FIG. 7 is a schematic plan view illustrating a sensor according to the first embodiment.

As shown in FIG. 7, in a sensor 113 according to the embodiment, the plurality of first fixing members 31 do not overlap the outer edge of the sensor base 10*s* in the first direction D1. The plurality of first fixing members 31 are provided inside the outer edge. Except for this, the configuration of the sensor 113 is the same as the configuration of the sensor 110. In the sensor 113 as well, stable characteristics are obtained. The second fixing member 32 may be provided in the sensor 113.

Second Embodiment

The second embodiment relates to an electronic device.

Figure 8:
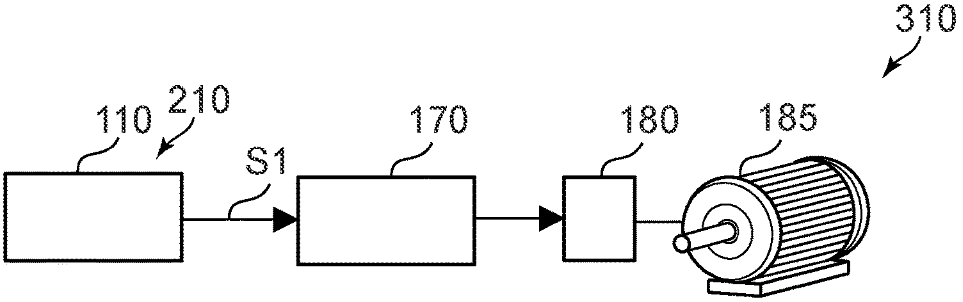
FIG. 8 is a schematic diagram illustrating an electronic device according to a second embodiment.

FIG. 8 is a schematic diagram illustrating an electronic device according to the second embodiment.

As shown in FIG. 8, an electronic device 310 according to the embodiment includes the sensor according to the embodiment and a circuit controller 170. In the example of FIG. 8, the sensor 110 (or sensor device 210) is depicted as the sensor. The circuit controller 170 is configured to control the circuit 180 based on the signal S1 obtained from the sensor. The circuit 180 is, for example, a control circuit of a driving device 185 or the like. According to the embodiment, the circuit 180 for controlling the driving device 185 and the like can be controlled with high accuracy based on the highly accurate detection result.

FIGS. 9A to 9H are schematic diagrams illustrating applications of the electronic device.

Figure 9A:
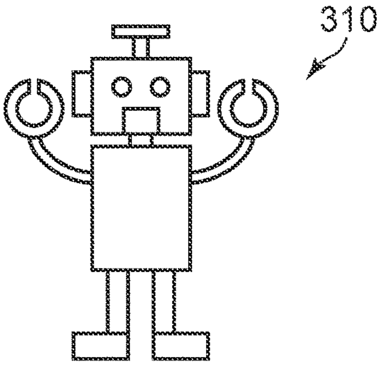
FIGS. 9A to 9H are schematic diagrams illustrating applications of the electronic device.
Figure 9B:
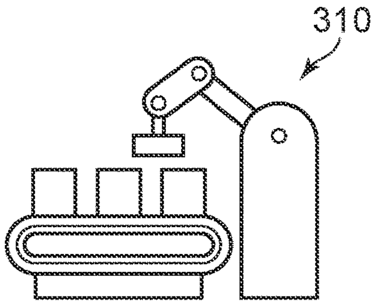
Figure 9C:
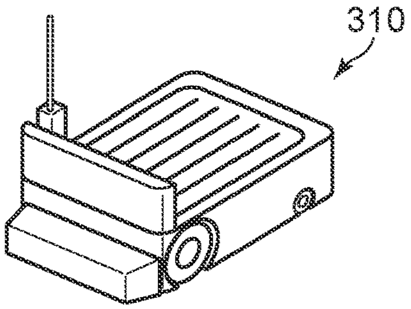
Figure 9D:
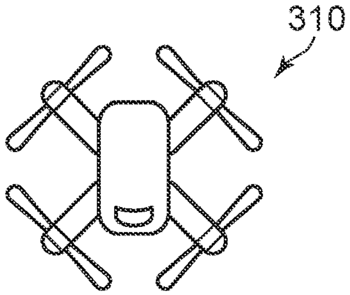
Figure 9E:
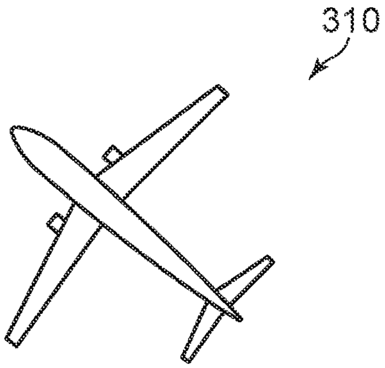
Figure 9F:
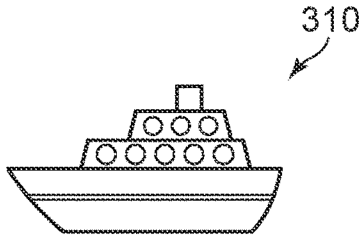
Figure 9G:
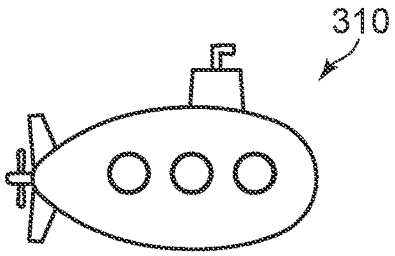
Figure 9H:
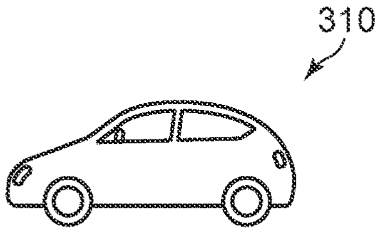

As shown in FIG. 9A, the electronic device 310 may be at least a part of a robot. As shown in FIG. 9B, the electronic device 310 may be at least a part of a work robot provided in a manufacturing factory or the like. As shown in FIG. 9C, the electronic device 310 may be at least a part of an automated guided vehicle such as in a factory. As shown in FIG. 9D, the electronic device 310 may be at least a part of a drone (unmanned aerial vehicle). As shown in FIG. 9E, the electronic device 310 may be at least a part of an airplane. As shown in FIG. 9F, the electronic device 310 may be at least a part of the vessel. As shown in FIG. 9G, the electronic device 310 may be at least a part of a submarine. As shown in FIG. 9H, the electronic device 310 may be at least a part of an automobile. The electronic device 310 may include, for example, a robot and/or mobile object.

The embodiments may include the following configurations (for example, technical proposals).

Configuration 1

A sensor, comprising:

a housing including a housing base;

a sensor section surrounded by the housing, the sensor section including a sensor base, a support portion fixed to the sensor base, a movable portion supported by the support portion, and a plurality of fixed electrodes fixed to the sensor base and facing the movable portion, a first gap being provided between the sensor base and the movable portion, the plurality of fixed electrodes being provided in n-rotational symmetry in a first plane perpendicular to a first direction from the sensor base to the support portion, the n being an integer of 2 or more; and a plurality of first fixing members fixing the sensor base to the housing base, the plurality of first fixing members being provided in the n-rotational symmetry in the first plane.

Configuration 2

The sensor according to Configuration 1, further comprising:

a plurality of first connection conductive members, one of the plurality of first connection conductive members being electrically connected to one of the plurality of fixed electrodes.

Configuration 3

The sensor according to Configuration 2, wherein the plurality of first connection conductive members do not overlap the plurality of first fixing members in the first direction.

Configuration 4

The sensor according to Configuration 3, wherein a distance between the support portion and the plurality of first connection conductive members is shorter than a distance between the support portion and the plurality of first fixing members.

Configuration 5

The sensor according to any one of Configurations 2-4, wherein each of the plurality of fixed electrodes includes a connection point electrically connected to the plurality of first connection conductive members, and the plurality of connection points of the plurality of fixed electrodes are provided in the n-rotational symmetry.

Configuration 6

The sensor according to any one of Configurations 1-5, wherein the n is 4 or more.

Configuration 7

The sensor according to any one of Configurations 1-6, wherein a first thickness of the sensor base along the first direction is not more than 2 times a second thickness of the movable portion along the first direction.

Configuration 8

The sensor according to any one of Configurations 1-6, wherein a first thickness along the first direction of the sensor base is 100 μm or less.

Configuration 9

The sensor according to any one of Configurations 1-6, wherein a second thickness along the first direction of the movable portion is 100 μm or less.

Configuration 10

The sensor according to any one of Configurations 1-9, wherein the sensor section further includes an intermediate layer, and at least a part of the intermediate layer is provided between the sensor base and the support portion.

Configuration 11

The sensor according to Configuration 10, wherein the intermediate layer includes silicon oxide.

Configuration 12

The sensor according to any one of Configurations 1-11, wherein the sensor section further includes a connect portion, a part of the connect portion is connected to the support portion, another part of the connect portion is connected to the movable portion, and a part of the first gap is provided between the sensor base and the connect portion.

Configuration 13

The sensor according to any one of Configurations 1-12, wherein the movable portion has an annular shape centered on the support portion.

Configuration 14

The sensor according to any one of Configurations 1-13, wherein at least a part of the plurality of first fixing members overlap a corner portion of the sensor base in the first direction.

Configuration 15

The sensor according to any one of Configurations 1-13, wherein at least a part of the plurality of first fixing members overlap a side of the sensor base in the first direction.

Configuration 16

The sensor according to any one of Configurations 1-15, further comprising:

a second fixing member, the second fixing member being provided between the housing base and the sensor base, and at least a part of the second fixing member overlapping the support portion in the first direction.

Configuration 17

The sensor according to any one of Configurations 1-16, wherein the housing further includes a housing member, the housing member is connected to the housing base, the sensor section is provided between the sensor base and a part of the housing member in the first direction, and a second gap is provided between the sensor section and the part of the housing member.

Configuration 18

The sensor according to Configuration 17, wherein a pressure inside the housing is less than 1 atmosphere.

Configuration 19

An electronic device, comprising:

the sensor according to Configurations 1-18; and a circuit controller configured to control a circuit based on a signal obtained from the sensor.

Configuration 20

The electronic device according to Configuration 19, wherein the electronic device includes at least one of a robot and a mobile object.

The embodiments can provide sensors and electronic devices with improved accuracy.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor sections, support portions, movable portions, fixed electrodes, fixing members, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and the electronic devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a housing including a housing base;

a sensor section surrounded by the housing, the sensor section including a sensor base, a support portion fixed to the sensor base, a movable portion supported by the support portion, and a plurality of fixed electrodes fixed to the sensor base and facing the movable portion, a first gap being provided between the sensor base and the movable portion, the plurality of fixed electrodes being provided in n-rotational symmetry in a first plane perpendicular to a first direction from the sensor base to the support portion, the n being an integer of 2 or more;

a plurality of first fixing members fixing the sensor base to the housing base, the plurality of first fixing members being provided in a similar n-rotational symmetry in the first plane to that as the fixed electrode; and a plurality of first connection conductive members, one of the plurality of first connection conductive members being electrically connected to one of the plurality of fixed electrodes, wherein a distance between the support portion and the plurality of first connection conductive members is shorter than a distance between the support portion and the plurality of first fixing members.

2. The sensor according to claim 1, wherein the plurality of first connection conductive members do not overlap the plurality of first fixing members in the first direction.

3. The sensor according to claim 1, wherein each of the plurality of fixed electrodes includes a connection point electrically connected to the plurality of first connection conductive members, and the plurality of connection points of the plurality of fixed electrodes are provided in a similar n-rotational symmetry to that as the fixed electrodes.

4. The sensor according to claim 1, wherein the n is 4 or more.

5. The sensor according to claim 1, wherein a first thickness of the sensor base along the first direction is not more than 2 times a second thickness of the movable portion along the first direction.

6. The sensor according to claim 1, wherein a first thickness along the first direction of the sensor base is 100 μm or less.

7. The sensor according to claim 1, wherein a second thickness along the first direction of the movable portion is 100 μm or less.

8. The sensor according to claim 1, wherein the sensor section further includes an intermediate layer, and at least a part of the intermediate layer is provided between the sensor base and the support portion.

9. The sensor according to claim 8, wherein the intermediate layer includes silicon oxide.

10. The sensor according to claim 1, wherein the sensor section further includes a connect portion, a part of the connect portion is connected to the support portion, another part of the connect portion is connected to the movable portion, and a part of the first gap is provided between the sensor base and the connect portion.

11. The sensor according to claim 1, wherein the movable portion has an annular shape centered on the support portion.

12. The sensor according to claim 1, wherein at least a part of the plurality of first fixing members overlap a corner portion of the sensor base in the first direction.

13. The sensor according to claim 1, wherein at least a part of the plurality of first fixing members overlap a side of the sensor base in the first direction.

14. The sensor according to claim 1, further comprising:

a second fixing member, the second fixing member being provided between the housing base and the sensor base, and at least a part of the second fixing member overlapping the support portion in the first direction.

15. The sensor according to claim 1, wherein the housing further includes a housing member, the housing member is connected to the housing base, the sensor section is provided between the sensor base and a part of the housing member in the first direction, and a second gap is provided between the sensor section and the part of the housing member.

16. The sensor according to claim 15, wherein a pressure inside the housing is less than 1 atmosphere.

17. An electronic device, comprising:

the sensor according to claim 1; and a circuit controller configured to control a circuit based on a signal obtained from the sensor.

18. The electronic device according to claim 17, wherein the electronic device includes at least one of a robot and a mobile object.

* * * * *